(12) United States Patent
Summerfield et al.

(10) Patent No.: US 8,274,290 B2
(45) Date of Patent: Sep. 25, 2012

(54) SOURCE MONITORING FOR ELECTROMAGNETIC SURVEYING

(75) Inventors: Philip J. Summerfield, Katy, TX (US); Ruben Quintanilla, Katy, TX (US); Anne K. Rutledge, Clear Lake Shores, TX (US); Xinyou Lu, Missouri City, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 657 days.

(21) Appl. No.: 12/087,439

(22) PCT Filed: Dec. 6, 2006

(86) PCT No.: PCT/US2006/046533
§ 371 (c)(1),
(2), (4) Date: Nov. 24, 2008

(87) PCT Pub. No.: WO2007/094846
PCT Pub. Date: Aug. 23, 2007

(65) Prior Publication Data
US 2009/0072831 A1    Mar. 19, 2009

Related U.S. Application Data

(60) Provisional application No. 60/773,091, filed on Feb. 14, 2006.

(51) Int. Cl.
*G01V 3/00* (2006.01)
(52) U.S. Cl. .................... 324/365; 324/348
(58) Field of Classification Search .......... 324/348, 324/365
See application file for complete search history.

(56) References Cited

U.S. PATENT DOCUMENTS

| | | | |
|---|---|---|---|
| 4,092,629 A * | 5/1978 | Siems et al. | 367/79 |
| 4,319,347 A * | 3/1982 | Savit | 367/52 |
| 6,661,795 B1 * | 12/2003 | Adas et al. | 370/395.1 |
| 7,018,229 B2 * | 3/2006 | Otto et al. | 439/381 |
| 7,356,412 B2 * | 4/2008 | Tompkins | 702/2 |
| 7,613,570 B2 * | 11/2009 | Rosten et al. | 702/6 |
| 2002/0023258 A1 * | 2/2002 | Elwahab et al. | 717/122 |
| 2002/0044525 A1 * | 4/2002 | Czerwiec et al. | 370/216 |
| 2003/0193953 A1 | 10/2003 | Drort et al. | |
| 2004/0100263 A1 * | 5/2004 | Fanini et al. | 324/339 |
| 2004/0108854 A1 | 6/2004 | Nichols | |
| 2004/0232917 A1 | 11/2004 | Wright et al. | |

(Continued)

FOREIGN PATENT DOCUMENTS

GB    2396218 A    6/2004

(Continued)

OTHER PUBLICATIONS

Chessman, S. J. et al., (1986), "On the theory of sea-floor conductivity mapping using transient electromagnetic systems", *Geophysics*, vol. 52, No. 2, pp. 204-217.

(Continued)

*Primary Examiner* — Bot Ledynh
(74) *Attorney, Agent, or Firm* — ExxonMobil Upstream Research Company Law Dept.

(57) ABSTRACT

Method for real time monitoring of the waveform transmitted by an electromagnetic survey source, using a near-source monitoring receiver to measure electromagnetic field and transmitting the measured signal in real time to a control location.

16 Claims, 8 Drawing Sheets

U.S. PATENT DOCUMENTS

| | | | |
|---|---|---|---|
| 2005/0193811 A1* | 9/2005 | Bilby et al. | 73/152.43 |
| 2005/0251340 A1 | 11/2005 | Tompkins | |
| 2006/0009911 A1 | 1/2006 | Burkholder et al. | |
| 2006/0010247 A1 | 1/2006 | Zimler | |
| 2007/0127510 A1* | 6/2007 | Bossemeyer et al. | 370/401 |
| 2009/0168776 A1* | 7/2009 | Baum et al. | 370/390 |

FOREIGN PATENT DOCUMENTS

| | | |
|---|---|---|
| WO | WO 01/49001 A1 | 7/2001 |
| WO | WO 2004/008183 A2 | 1/2004 |
| WO | WO 2004/053528 A1 | 6/2004 |
| WO | WO 2005/006022 A1 | 1/2005 |
| WO | WO 2005/081016 A1 | 9/2005 |
| WO | WO 2005/081719 A2 | 9/2005 |
| WO | WO 2005/117326 A2 | 12/2005 |
| WO | WO 2006/000538 A1 | 1/2006 |
| WO | WO 2007/046952 A2 | 4/2007 |

OTHER PUBLICATIONS

Constable, S. et al., (1996), "Marine Controlled-source Electromagnetic sounding 2. The PEGASUS Experiment", *Journal of Geophysical Research*, vol. 101, No. B3, pp. 5519-5530.

Duncan, P. M. et al., (1980), "The Development and Applications of a Wide Band Electromagnetic Sounding System Using a Pseudo-noise Source", *Geophysics*, vol. 45, No. 8, pp. 1276-1296.

Eidesmo, T. et al., (2002), "Sea Bed Logging (SBL), a New Method for Remote and Direct Identification of Hydrocarbon Filled Layers in Deepwater Areas", *First Break*, vol. 20.3, pp. 144-152.

Ellingsrud, S. et al., (2002), "Remote Sensing of Hydrocarbon Layers by Seabed Logging (SBL): Results from a Cruise Offshore Angola", *The Leading Edge*, October, pp. 972-982.

MacGregor, L. M. (1997), "Electromagnetic Investigation of the Reykjanes Ridge near 58 North", Ph.D. Dissertation, Cambridge, pp. 63, 79, 82, and 84-86.

MacGregor, L. M. et al., (1998) "The RAMESSES experiment—III. Controlled-source electromagnetic sounding of the Reykjanes Ridge at 57°45'N", *Geophys. J. Int.*, Jul. 8, 1998, pp. 773-789.

MacGregor, L.. et al. (2001), "Electrical Resistivity Structure of the Valu Fa Ridge, Lau Basin, from Marine Controlled-source Electromagnetic Sounding", *Geophy. J. Int.*, vol. 146, pp. 217-236.

Summerfield, P.J., et al. (2005), "Marine CSEM Acquisition Challenges", Society of Exploration Geophysicists International Exposition and Seventy-Fifth Annual Meeting, Nov. 6-11, 2005, Houston, Texas.

*European Search Report*, (2006), RS 113668, Aug. 10, 2006, 1 page.
*International Search Report*, (2008), PCT/US2006/046533, Sep. 19, 2008, 1 page.

\* cited by examiner

SOURCE MONITORING FOR ELECTROMAGNETIC SURVEYING

This application is the National Stage entry under 35 U.S.C. 371 of PCT/US2006/046533 that published as WO 2007/094846 and was filed on Dec. 6, 2006 and claims the benefit of U.S. Provisional Application 60/773,091, filed 14 Feb. 2006.

FIELD OF THE INVENTION

This invention relates generally to the field of geophysical prospecting and, more particularly, to controlled source electromagnetic surveying. Specifically, the invention is a method and apparatus system for monitoring the signal transmitted by an electromagnetic source in a geophysical survey of a subterranean region.

BACKGROUND OF THE INVENTION

Figure 1:
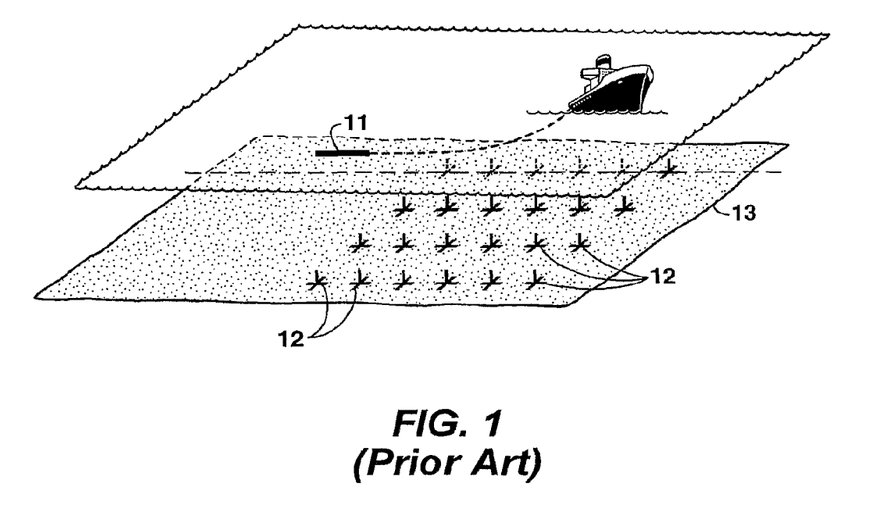
FIG. 1 illustrates deployment of equipment for a typical marine CSEM survey.

Controlled-source electromagnetic ("CSEM") geophysical surveys use man-made electromagnetic ("EM") fields to evaluate the presence of resistive strata within the earth. The resistance can be caused by salt, coal, freshwater or hydrocarbons. CSEM techniques currently do not provide conclusive evidence of hydrocarbons and are used in conjunction with other geophysical and geological data. CSEM surveys typically record the EM signal induced in the earth by a source (transmitter) and measured at one or more EM sensors (sometimes called detectors or receivers), deployed on the earth's surface, the seafloor or inside boreholes. The behavior of this signal as a function of transmitter location, frequency, and separation (offset) between transmitter and receiver can be diagnostic of rock properties associated with the presence or absence of hydrocarbons. Specifically, CSEM measurements are used to determine the spatially-varying electrical resistivity of the subsurface. This technology has been applied in tectonic studies, hydrocarbon and mineral exploration, environmental and geological engineering In the marine environment, CSEM data are typically acquired by towing a Horizontal Electric Dipole (HED) transmitting antenna 11 among a number of autonomous sea-floor receivers 12 positioned on the seafloor 13. (See FIG. 1) The receivers typically have multiple sensors designed to record different components of the electric and/or magnetic fields. The transmitter antenna is typically towed a few tens of meters above the seafloor. The receivers are weighted and fall to the seafloor, but are buoyant enough to rise back to the surface with the data after receiving an acoustic command from the ship.

Alternative dipole (source) configurations include:
laying the HED on the sea-floor and transmitting a waveform for several minutes to a few hours,
suspending the Electric Dipole vertically in the water column (Vertical Electric Dipole (VED)) and transmitting a waveform for several minutes to a few hours,
towing a VED (see PCT Patent Publication No. WO 2005/081719 A2), and
using a magnetic dipole source.

The transmitting and receiving systems typically operate independently (without any connection), so that receiver data must be synchronized with shipboard measurements of transmitter position by comparing clock times on the receivers to time from a shipboard standard (typically GPS derived UTC (Coordinated Universal Time)).

The energy transmitted by the source is in the form of a continuous high power current. The amplitude and frequency of the current output is controlled to generate a variety of different waveforms, including:
sine waves;
square waves;
Cox waves (*J. Geophys. Res.* 101, 5519-5530 (1996));
Pseudo-random binary sequences (*Geophysics* 45, 1276-1296 (1980));
logarithmically-spaced multipeak waves (PCT Publication No. WO2005/117326); and
time division multiple waveforms (PCT Patent Application No. PCT/US06/33695).

Figure 2:
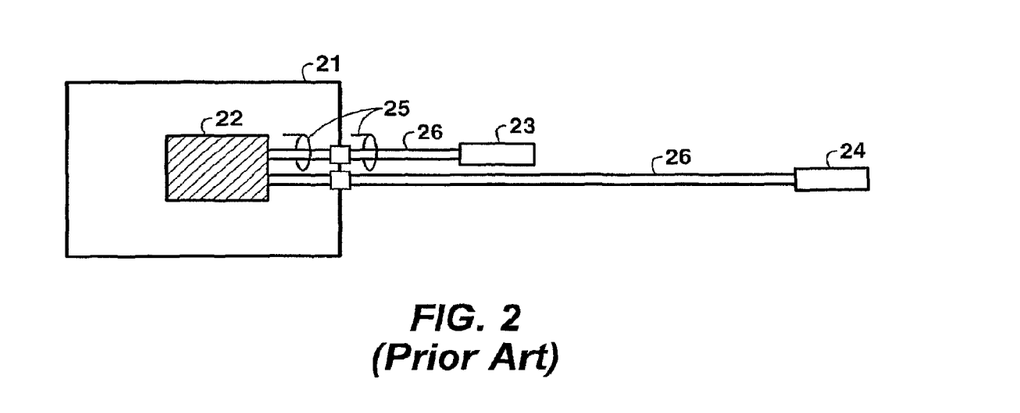
FIG. 2 is a schematic drawing of a typical HED source showing sensor locations for monitoring the transmitted signal.

A specific waveform is typically designed or selected for each survey area to provide an optimal combination of depth penetration and frequencies. The transmitted waveforms are typically generated using Alternating Current (AC) signals with high current and low voltage. In order to process CSEM survey data and interpret the data, it is necessary to know the EM signal being transmitted. Typically, instrumentation is used to monitor the transmitter for this purpose. The key components of conventional waveform monitoring are illustrated in FIG. 2, which is a schematic representation of a CSEM Horizontal Electric Dipole (HED) source. The main pressure vessel 21 will house the switching hardware 22 which generates the specified waveform from a high current (>500 A), low voltage (~100V) AC or DC input signal. The two electrodes, a "near" electrode 23 and a "far" electrode 24, are attached to the switch outputs via a streamer or dipole 26. Typical distances from the pressure vessel are ~20-30 meters and ~100-300+ meters for the near and far electrodes, respectively. Conventional waveform monitoring is performed using a current clamp, Hall effect transducer or equivalent, which generates a calibrated output current based on an input electric or magnetic field. The possible sensor locations 25 for such a conventional monitoring device are illustrated; they capture the waveform at the pressure vessel and not the waveform physically transmitted by either electrode.

Figure 3A:
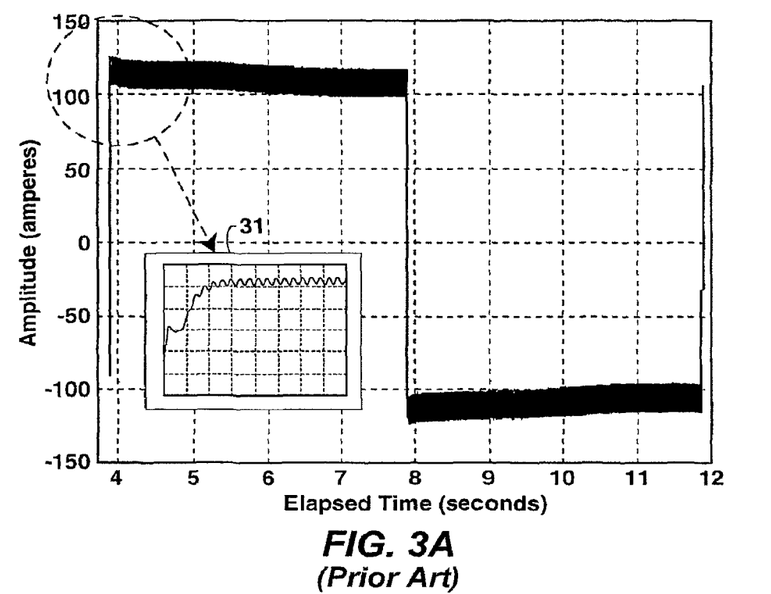
FIGS. 3A-B show typical CSEM waveforms, as generated by actual commercial sources.
Figure 3B:
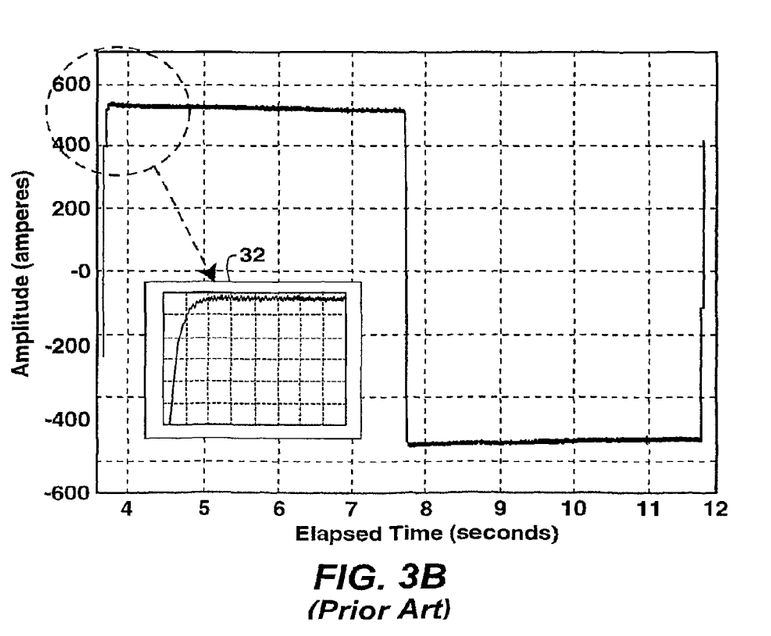

The actual transmitted signal must accurately represent the design waveform to meet the chosen criteria. Typical transmitted waveforms are shown in FIGS. 3A and 3B. FIG. 3A shows an 8-second square wave generated by a source called DASI-II (originally developed by Cambridge University, England, UK). The high current signal is generated as a 256 Hz sine wave, which is rectified and the resulting 512 Hz half sinusoids are switched via a bridge to generate the desired waveform. The insert 31 shows an exploded view of the first second of the square wave, which reveals that the 512 Hz half sinusoids are present in the transmitted waveform. All one-sided transmissions exhibit a reduction in transmitted current (~5%) which is believed to be an electrical limitation of, or electrochemical reaction at, the electrodes. FIG. 3B shows an 8-second square wave generated by a source designated DASI-III (developed by O.H.M. Limited, Scotland, UK). The exploded view in the insert 32 shows a ripple at ~360 Hz present in the transmitted waveform, as a result of rectifying 3-phase 60 Hz A/C power.

Figure 4A:
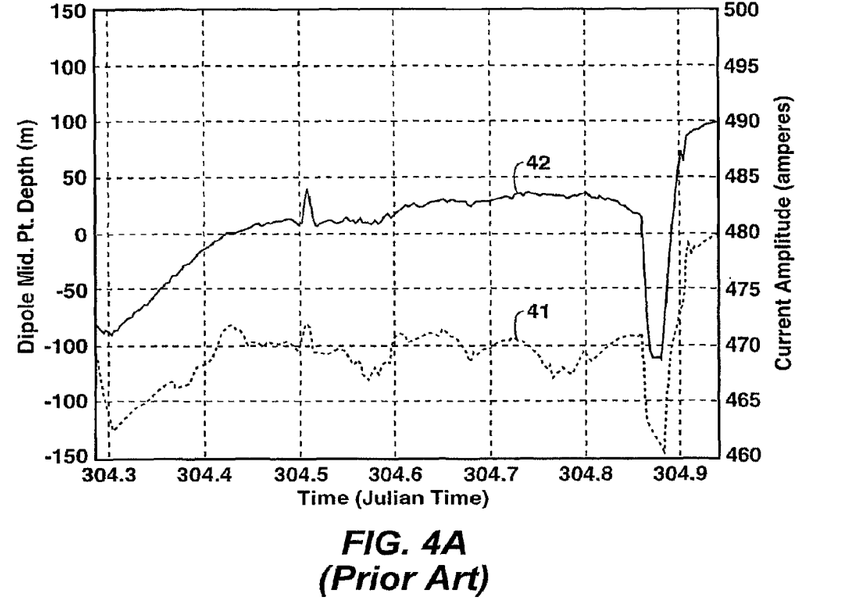
FIGS. 4A-E illustrate CSEM source signals on longer time scales.
Figure 4B:
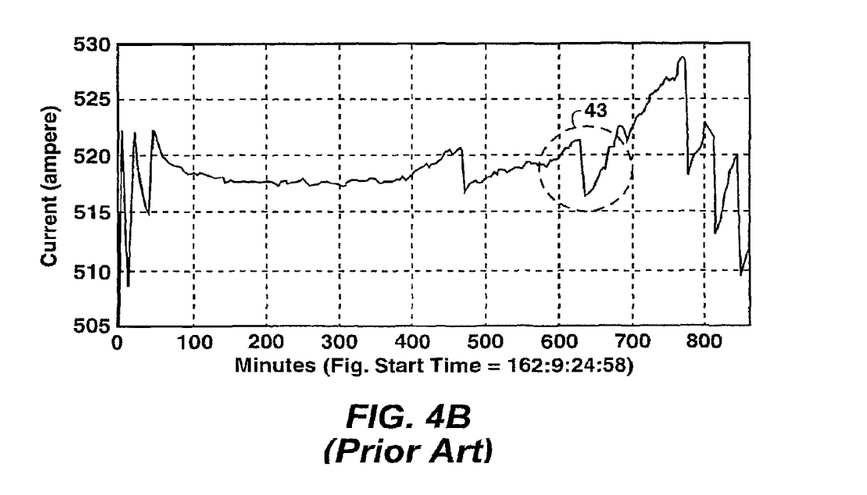
Figure 4C:
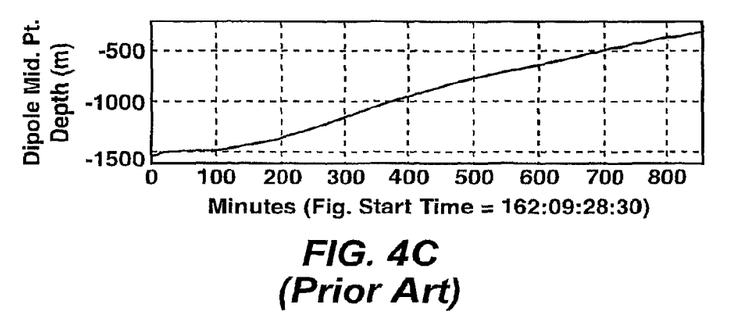
Figure 4D:
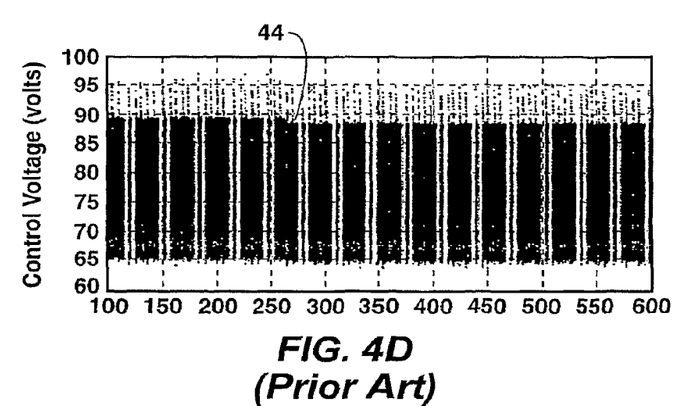

FIG. 4A shows on a much longer time scale a source signal 41 generated to by a CSEM source complete with control circuitry to ensure constant transmitted voltage. The depth of the source dipole's midpoint is shown by 42. The transmitted current is a function of transmitted voltage÷resistance of the medium surrounding the electrodes, and resistance is approximately inversely proportional to salinity, the major factor that influences resistance. The short term change in HED depth (at ~304.875 Julian days) coincides with the source crossing a sea floor channel. As the source maintains a constant altitude above the sea-floor, the water depth increases (i.e. becomes deeper) at the channel, causing salinity to go down (salinity decreases with water depth), resistance to increase, and consequently transmitted current to decrease. FIG. 4B shows source signal over a long time frame for another constant-voltage CSEM source, and FIG. 4C shows the corresponding source depth. Discontinuities in the transmitted current such as 43 are due to operator reduction 44 of the input voltage (FIG. 4D).

Figure 4E:
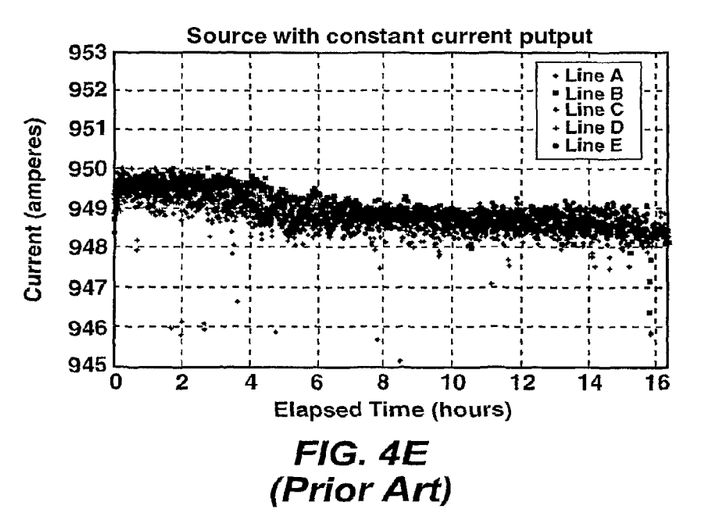

The transmitted amplitude may experience both short term (FIGS. 3A and 3B) and long term (FIGS. 4A and 4B) variations, which must be captured and fully compensated for during data processing. The same is true when the CSEM source has control circuitry to ensure constant transmitted current, as shown in FIG. 4E. The points plotted in FIG. 4E represent five different source lines of different durations: 6, 14, 15, 16 and 20 hours. This demonstrates the repeatability of CSEM sources that incorporate additional control circuitry. The repeatability in this example is better than 0.1%.

An attempt to monitor the transmitted waveform by means other than the current clamp 25 of FIG. 2 is detailed by MacGregor in *Electromagnetic investigation of the Reykjanes Ridge near 58 North*, Ph.D. Dissertation, Cambridge, pages 63, 79 and 82 (1997). This attempt is described as follows: "A mini-streamer containing four electrodes placed at 22, 48, 88, and 89 m behind the "DASI" (Deep towed Active Source Instrument) is attached to the main array to monitor the transmitted fields. Voltages between the outer pair (22 m and 89 m) and inner pair (48 m and 88 m) of electrodes are recorded on two channels of a data logger mounted on DASI." This solution was technology limited, stated as follows: "Data storage limitations in the piggyback logger meant that the source fields were logged for at most three minutes in every half hour of transmission." The results of the waveform monitoring are described: "During the first tow, the piggyback data logger recorded the source fields for only three minutes in every hour. In order to reconstruct the transmission pattern, the times at which the source frequency changed are required. Insufficient frequency transitions were logged to be able to use the piggyback logger to reconstruct the transmission pattern." Further: "To establish the transmission pattern during tow 2, frequencies and transition times were measured from the piggyback logger record. This provides an incomplete record of transmission since it logged for only three minutes in each half-hour. However, enough frequency transitions were detected for the record to be used in reconstructing the source pattern." Not long thereafter, the current clamp, for example a Hall Effect transducer, located essentially as illustrated by 25 in FIG. 2, became the widely accepted way to monitor the transmitted waveform, and will be referred to herein as "conventional waveform monitoring."

The present inventors discovered a problem with conventional waveform monitoring during examination of CSEM data from a survey conducted during the period Jul. 7, 2003 to Dec. 2, 2004, which led to the present invention as described herein below.

SUMMARY OF THE INVENTION

Figure 8:
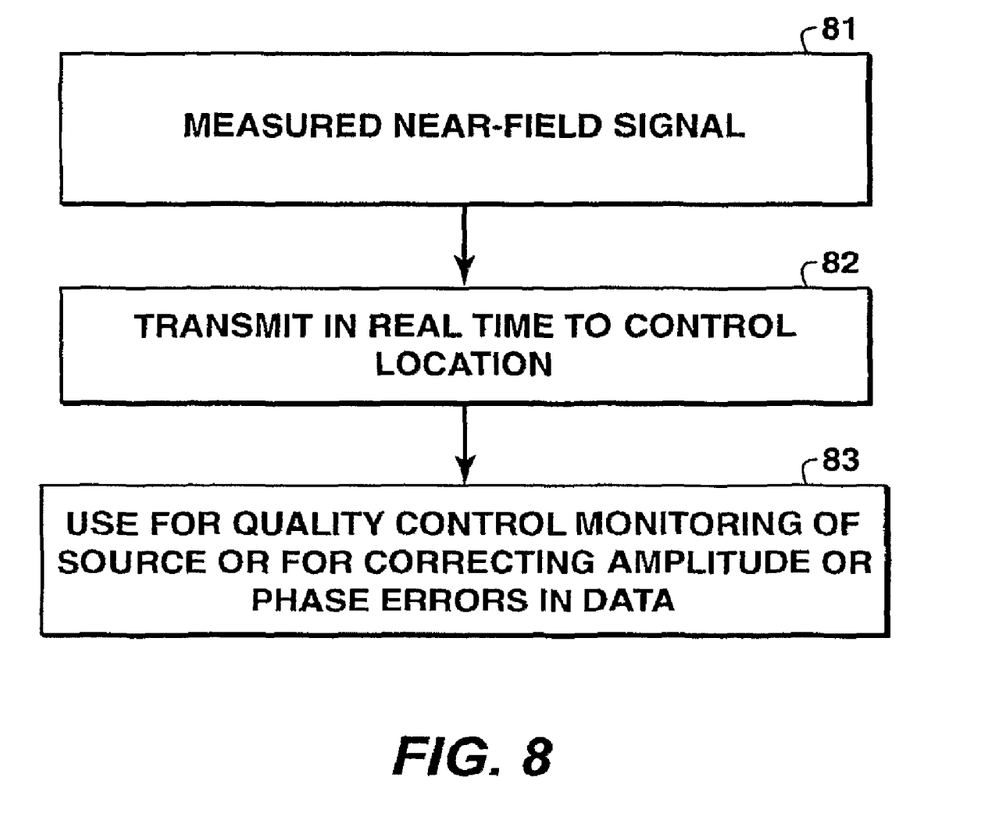
FIG. 8 is a flow chart showing basic steps in some embodiments of the invention.

In one embodiment, the invention is a method for monitoring a signal transmitted by an electromagnetic source in a controlled-source electromagnetic survey of a subterranean region, comprising; (a) measuring at least one electromagnetic field component (the "measured signal") with an electromagnetic receiver ("monitor receiver") while the source is activated, said monitor receiver's location being selected such that direct transmission from the source dominates the measured signal (step 81 in the flow chart of FIG. 8); and (b) transmitting the measured signal in real time from the monitor receiver to a control location (step 82). The measured signal may be used for quality control monitoring of the source and to correct amplitude or phase errors in the CSEM data (step 83).

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

Figure 5A:
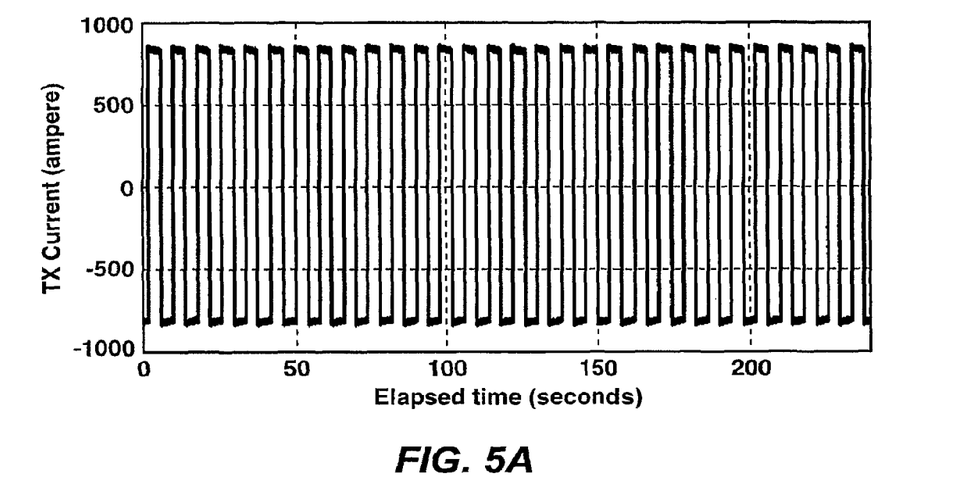
FIGS. 5A-B show an 8-second square wave as sampled at the source (FIG. 5A) and at a sea floor receiver (FIG. 5B)
Figure 5B:
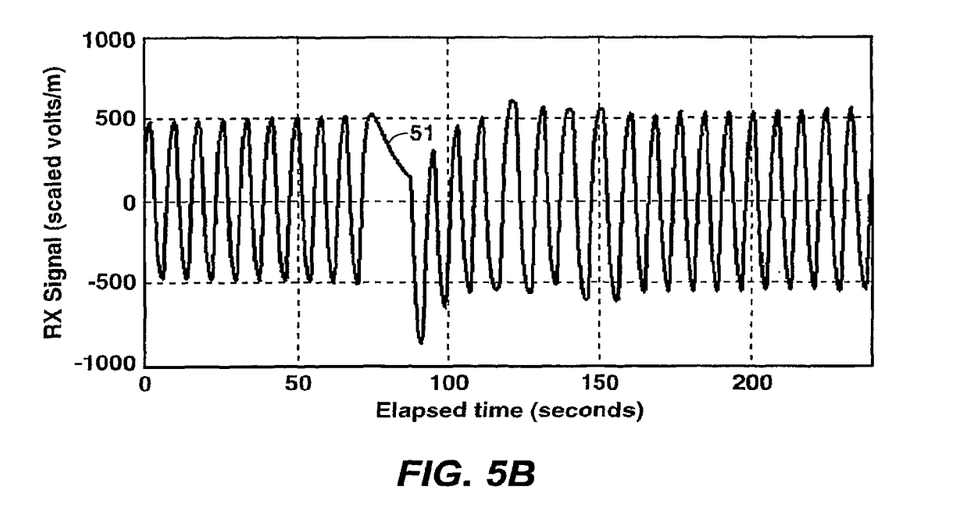

A problem with the conventional waveform monitoring was discovered by the present inventors by examining the time series data as shown in FIG. 5A against that of a nearby sea floor receiver (FIG. 5B). (Tx denotes an x-oriented horizontal electric dipole source and Rx denotes a receiver with sensor oriented to measure the x-component of the electric field.) The sea-floor receiver detected an anomaly 51 in the waveform, which the source monitoring did not, nor could the anomaly be explained by a filter response (Earth filter or receiver amplifier filter). This data example illustrates a potential failure mode of conventional waveform monitoring.

The present invention is a method and apparatus for complete monitoring of a CSEM waveform by capturing the electromagnetic fields physically transmitted into the surrounding medium (seawater or sea floor, in the case of a marine environment). This approach captures any and all waveform disturbances and distortions caused by, for example, the physical streamer dipole, electrodes, or connectors, which are not captured by the conventional "current clamp" solution such as is depicted in FIG. 2. The invention samples the transmitted waveform in close proximity to the CSEM source ("near field") or otherwise such that an Earth response filter does not attenuate the waveform. Seafloor receivers cannot normally be used to accurately monitor the transmitted waveform due to their spatial separation from the source and the natural filtering of the signal due to the Earth's response. The sampled waveform may be digitized and recorded, on the surface survey vessel or other control location and, possibly, on the CSEM source as a data backup. The data are telemetered (preferably continuously) in real-time between the near-field monitor receiver and the surface "survey" vessel using a variety of data transmission standards, including multiplexers operating over fiber-optic or copper conductors embedded in the tow umbilical.

The complete "near field" CSEM waveform can be used in real-time to provide complete and accurate quality control information. The waveform and its associated spectra can be analyzed with respect to the design waveform. The design waveform can contain a very specific frequency spectrum to target a range of depths and offsets. Any significant variation between the design and actual waveforms, in amplitude or phase, can be determined in real-time, which provides operational efficiencies during data acquisition.

Figure 6A:
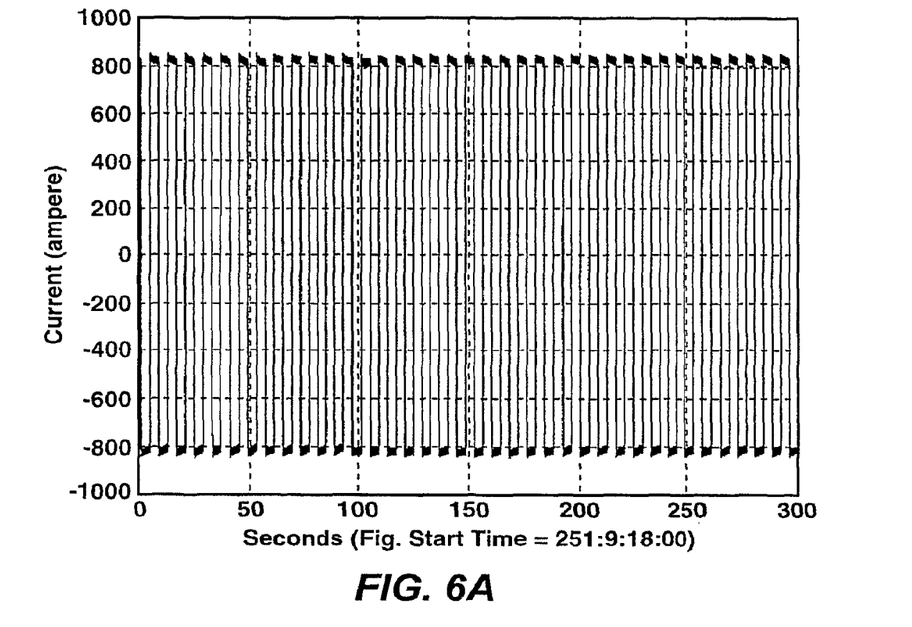
FIGS. 6A-B show simultaneous waveform monitoring results, using a conventional current clamp (Hall Effect transducer) for FIG. 6A and a near-field dipole according to the present invention for FIG. 6B.
Figure 6B:
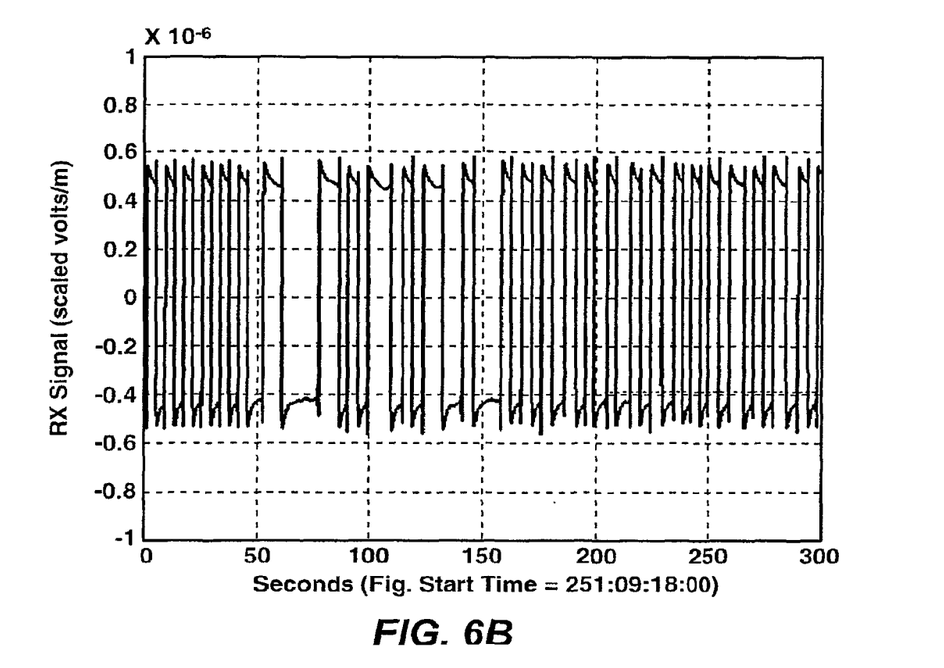
Figure 7A:
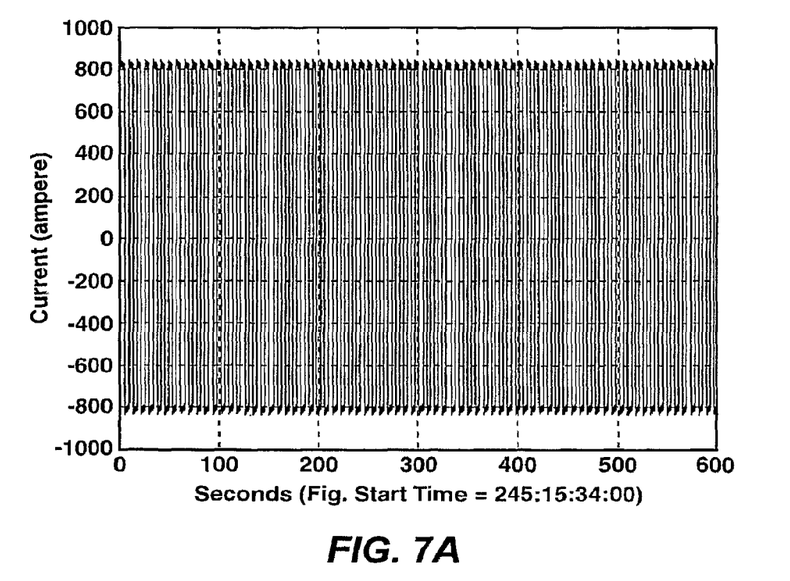
FIGS. 7A-B show another comparison of simultaneous waveform monitoring results, conventional (7A) vs. the near-field dipole of the present invention (7B)
Figure 7B:
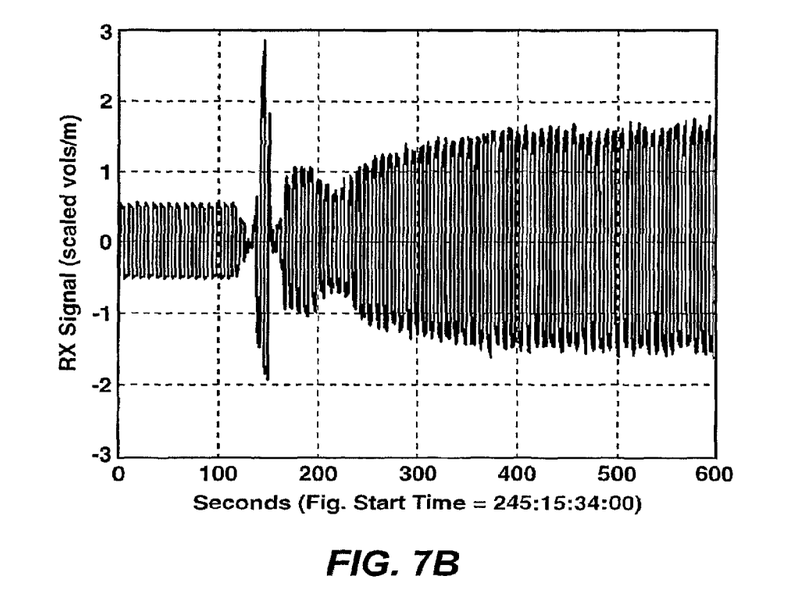

FIGS. 6A-B and 7A-B contain examples where the transmitted waveform was captured using the conventional current clamp monitor and a near-field monitor according to the present invention. In each example, the transmitted waveform contained either amplitude or phase irregularities. In both cases, the failure was detected by the near-field monitor but not the current clamp. In both examples, a Hall Effect transducer was used for the current clamp monitor, and the results are shown in FIGS. 6A and 7A. There is no sign of any irregularity of either amplitude or phase. The near-field monitors tell a different story. FIG. 6B shows phase instabilities while FIG. 7B shows amplitude variations. In the particular example of FIGS. 6A-B (and also in the case of FIGS. 5A-B), the phase instabilities were subsequently traced to a software 'bug' in the CSEM source. (The control electronics and the waveform monitoring systems shared a common clock. The clock sub-system would occasionally hang or freeze for several seconds under certain conditions. Whenever this happened, the transmitter would continue to transmit the last instruction set, typically a positive or negative current. This prolonged transmission would appear as a phase instability, as in FIG. 6B. (The near-field monitors used their own, independent clock, just as do the receivers that record CSEM survey data, and thus the near-field monitors were able to reveal the software problem.) In the example of FIGS. 7A-B, the cause of the amplitude instabilities was not determined, but is believed to be due to a failure of the streamer, coupling or electrode.

The complete "near-field" CSEM waveform can also be used in data processing to provide transmitter current phase and amplitude correction. The transmitted waveforms have different amplitude and phase spectra. In addition, these spectra have an overall phase shift associated with start time of the transmitter. In principle, the desired normalized earth response to the source excitation is the receiver spectra divided by the transmitter spectra:

$$(A, \phi) = \frac{A_{RX} e^{i\phi_{RX}}}{A_{TX} e^{i\phi_{TX}}},$$

where $A$ and $\phi$ are the amplitude and phase of the response, $A_{TX}$ and $\phi_{TX}$ are amplitude and phase of transmitter data, $A_{RX}$ and $\phi_{RX}$ for receiver. Both the receiver spectra and transmitter spectra would be determined bin-by-bin from the recorded data. Therefore, accurate, continuous, sufficiently dense transmitter waveform monitoring is essential to get accurate earth response. The quantities $(A_{RX}, \phi_{RX})$ and $(A_{TX}, \phi_{TX})$ can be obtained by Fourier transform on recorded time series receiver and transmitter data, respectively, with proper corrections and normalizations.

In preferred embodiments of the present invention:

An independent local oscillator should control the control electronics (including A/D converter and time tagging functionality). The oscillator should be disciplined by a GPS derived UTC (Coordinated Universal Time) time mark to minimize the oscillator drift.

The data is telemetered in real-time between the near-field monitor and the surface survey vessel (in the case of a marine survey) using a broadband (at least 155 Mbps) multiplexer based on an Asynchronous Transfer Mode (ATM) protocol over a fiber-optic link. Alternatively, the multiplexer is based on an Asynchronous Transfer Mode (ATM) protocol using Asymmetric Digital Subscriber Line (ADSL) technology over twisted pair copper cable. However, the present invention is not limited to certain protocols or current industry standards. The data are preferably transmitted in digital form to reduce noise pickup, but may be reconverted to an analog signal for processing after being received at the control location (typically on the surface vessel) if desired.

The near-field waveform should be sampled at least twice the Nyquist frequency used to generate the transmitted waveform.

The near-field monitor's full system response should be estimated through calibration and removed during data processing and quality control analysis.

The near-field monitor's antenna electrodes should be located close to the CSEM source to sample the transmitted waveform and not the earth's filter response. The essential element in this regard is that the electromagnetic field measured by the near-field monitor must be dominated by direct transmission from the source. A person skilled in the art will be able to decide when this condition is sufficiently satisfied under the particular survey circumstances, but as a rule of thumb, the direct transmission from the source may be considered to dominate when it constitutes at least 70% of the signal measured by the near-field monitor receiver, preferably at least 90%, even more preferably at least 95%. That is, the portion of the measured signal that is due to signal paths that pass through the sea bottom (in the case of a marine survey) must be small. This is the opposite of what one wants from the survey receivers, because only signal that has penetrated the sea floor can indicate the presence of hydrocarbons. The easiest (but not the only) way to satisfy the above-stated condition for near-field monitoring is to locate the monitor (or monitors—see below) sufficiently close to the transmitter antenna. Thus, a sea-floor receiver, such as one of the survey receivers, could be used as a near-field monitor if the above-stated condition is satisfied, and if that receiver is connected to means for transmitting the measured signal to a control location in real time. The person skilled in the art will understand that numerical limits on monitor spacing and location cannot be specified. In addition to the above-stated criterion for location of a near-field monitor, near field monitors should even more preferably be located close to each CSEM source electrode, i.e. the "near electrode (23 in FIG. 2) and the "far" electrode (24). Using a different monitoring receiver for each electrode will monitor any difference between the signal (amplitude and phase) injected from the electrodes into the surrounding medium. Such differences could occur due to the different streamer lengths (and hence different physical properties, including resistance) connecting the electrodes to the source electronics. In such embodiments, proximity to the electrode being monitored is important (relative to distance from the other electrode).

Further details of some of the disclosures herein may be found in the paper entitled "Marine CSEM Acquisition Challenges," presented on Nov. 8, 2005 at the Society of Exploration Geophysicists International Exposition and Seventy-Fifth Annual Meeting, Houston, Tex. A copy of this paper is incorporated herein by reference to the extent it is not inconsistent or conflicting with the disclosure herein.

The foregoing application is directed to particular embodiments of the present invention for the purpose of illustrating it. It will be apparent, however, to one skilled in the art, that many modifications and variations to the embodiments described herein are possible. For example, the invention is described in terms of marine CSEM surveys, but the method can be applied as well to CSEM surveys conducted on land. All such modifications and variations are intended to be within the scope of the present invention, as defined in the appended claims.

The invention claimed is:

1. A method for monitoring a signal transmitted by an electromagnetic source in a controlled-source electromagnetic survey of a subterranean region, comprising:
    (a) measuring at least one electromagnetic field component, referred to herein as the measured signal, with an electromagnetic receiver, referred to herein as the monitor receiver, while the source is activated, said monitor receiver's location being selected near but not on the source, such that direct transmission from the source dominates the measured signal;
    (b) transmitting the measured signal in real time from the monitor receiver to a control location; and
    (c) using the measured signal from the monitor receiver to check for amplitude or phase irregularities in the transmitted signal, or any differences from a design waveform input to the source.

2. The method of claim 1, wherein in the transmitting step the measured signals are telemetered using a broadband multiplexer.

3. The method of claim 2, wherein the multiplexer is based on an Asynchronous Transfer Mode (ATM) protocol using Asymmetric Digital Subscriber Line (ADSL) technology over twisted pair copper cable.

4. The method of claim 2, wherein the multiplexer is based on an Asynchronous Transfer Mode (ATM) protocol and the transmitting is over a fiber-optic link.

5. The method of claim 1, wherein the survey is in a marine environment and the control location is a surface vessel.

6. A method for quality control of transmission of a design waveform in a controlled-source survey of a subterranean region, comprising:
    (a) measuring at least one electromagnetic field component, referred to herein as the measured signal, with an electromagnetic receiver while the source is activated, said receiver's location being selected near but not on the source, such that direct transmission from the source dominates the measured signal;
    (b) transmitting the measured signal in real time from the receiver to a control location; and
    (c) comparing the measured signal to the design waveform.

7. A method for processing data from a controlled-source survey of a subterranean region to provide transmitter amplitude and phase correction, said survey including an electromagnetic source transmitting an electromagnetic signal with corresponding response detected by at least one survey receiver, said method comprising:
    (a) measuring at least one electromagnetic field component, hereafter referred to as the measured source signal, with a monitor receiver while the source is activated, said monitor receiver's location being selected near but not on the source, such that direct transmission from the source dominates the measured source signal;
    (b) transmitting the measured source signal in real time from the monitor receiver to a control location; and
    (c) using the measured source signal to correct amplitude and phase of response data from the one or more survey receivers.

8. The method of claim 7, wherein the corrected amplitude of the response is $A_{RX} \div A_{TX}$ and the corrected phase is $\phi_{RX} - \phi_{TX}$, where $A_{TX}$ and $\phi_{TX}$ are amplitude and phase of the measured source signal, and $A_{RX}$ and $\phi_{RX}$ are amplitude and phase of the response detected by a survey receiver.

9. The method of claim 1, wherein the measured electromagnetic field component is an electric field component.

10. The method of claim 1, wherein the measured electromagnetic field component is a magnetic field component.

11. The method of claim 1, further comprising converting the measured signal from analog to digital before transmitting to the control location, sampling the measured signal at a frequency at least twice the Nyquist frequency used to generate the transmitted source signal.

12. A method for producing hydrocarbons from a subterranean region, comprising:
    (a) performing a controlled source electromagnetic survey of the subterranean region;
    (b) measuring at least one electromagnetic field component, hereinafter referred to as the measured signal, with an electromagnetic receiver while the source is activated, said receiver's location being selected near but not on the source, such that direct transmission from the source dominates the measured signal;
    (c) transmitting the measured signal in real time from the receiver to a control location;
    (d) using the transmitted measured signal for quality control monitoring of the transmitted signal or to correct amplitude and phase response of data from the survey; and
    (e) producing hydrocarbons from reserves identified in the survey's results.

13. The method of claim 1, further comprising monitoring each electrode of the source's transmitter antenna separately with a different monitor receiver, using proximity to the respective electrodes to differentiate location of the monitor receivers.

14. The method of claim 1, wherein said measured signal transmitted in real time provides electromagnetic field data as a function of time, where measurement time is provided by a clock separate and independent from any clock used by the source's control system.

15. The method of claim 1, wherein said measured signal is transmitted in real time continuously as data are collected in the survey.

16. The method of claim 1, wherein the controlled-source electromagnetic survey is performed in a marine environment, and said direct transmission from the source passes through water to arrive at the monitor receiver.

* * * * *